United States Patent
McKinney

(10) Patent No.: US 10,106,445 B2
(45) Date of Patent: Oct. 23, 2018

(54) AEROBIC TREATMENT/CLARIFIER SYSTEM FOR USE IN AN AEROBIC WASTEWATER TREATMENT SYSTEM

(76) Inventor: Jerry L. McKinney, Silsbee, TX (US)

( * ) Notice: Subject to any disclaimer, the term of this patent is extended or adjusted under 35 U.S.C. 154(b) by 0 days.

(21) Appl. No.: 13/017,056

(22) Filed: Jan. 31, 2011

(65) Prior Publication Data

US 2011/0186491 A1 Aug. 4, 2011

Related U.S. Application Data

(60) Provisional application No. 61/300,321, filed on Feb. 1, 2010.

(51) Int. Cl.
*C02F 3/12* (2006.01)
*C02F 3/02* (2006.01)

(52) U.S. Cl.
CPC .............. *C02F 3/02* (2013.01); *C02F 3/12* (2013.01); *C02F 3/121* (2013.01); *Y02W 10/15* (2015.05)

(58) Field of Classification Search
None
See application file for complete search history.

(56) References Cited

U.S. PATENT DOCUMENTS

| | | | |
|---|---|---|---|
| 5,770,081 A | 6/1998 | McKinney | |
| 5,874,003 A * | 2/1999 | Rose | 210/626 |
| 6,165,359 A * | 12/2000 | Drewery | 210/195.1 |
| D438,932 S | 3/2001 | McKinney | |
| 6,200,472 B1 * | 3/2001 | Donald et al. | 210/195.1 |
| D444,535 S | 7/2001 | McKinney | |
| D445,869 S | 7/2001 | McKinney | |
| 6,358,411 B1 | 3/2002 | McKinney | |
| 6,569,338 B1 * | 5/2003 | Ozyboyd | 210/624 |
| 7,178,677 B1 | 2/2007 | McKinney | |
| 7,294,261 B2 | 11/2007 | McKinney | |
| 2002/0113010 A1 * | 8/2002 | Ricketts | 210/615 |
| 2009/0250395 A1 * | 10/2009 | Aker | C02F 3/1242 210/626 |

* cited by examiner

*Primary Examiner* — Richard C Gurtowski
(74) *Attorney, Agent, or Firm* — Bushman Werner, P.C.

(57) ABSTRACT

An aerobic treatment/clarifying system for use in an aerobic wastewater treatment system. The system comprises a structure which defines at least one compartment, at least one aerobic treatment chamber and at least two clarifying chambers being formed in the compartment.

12 Claims, 14 Drawing Sheets

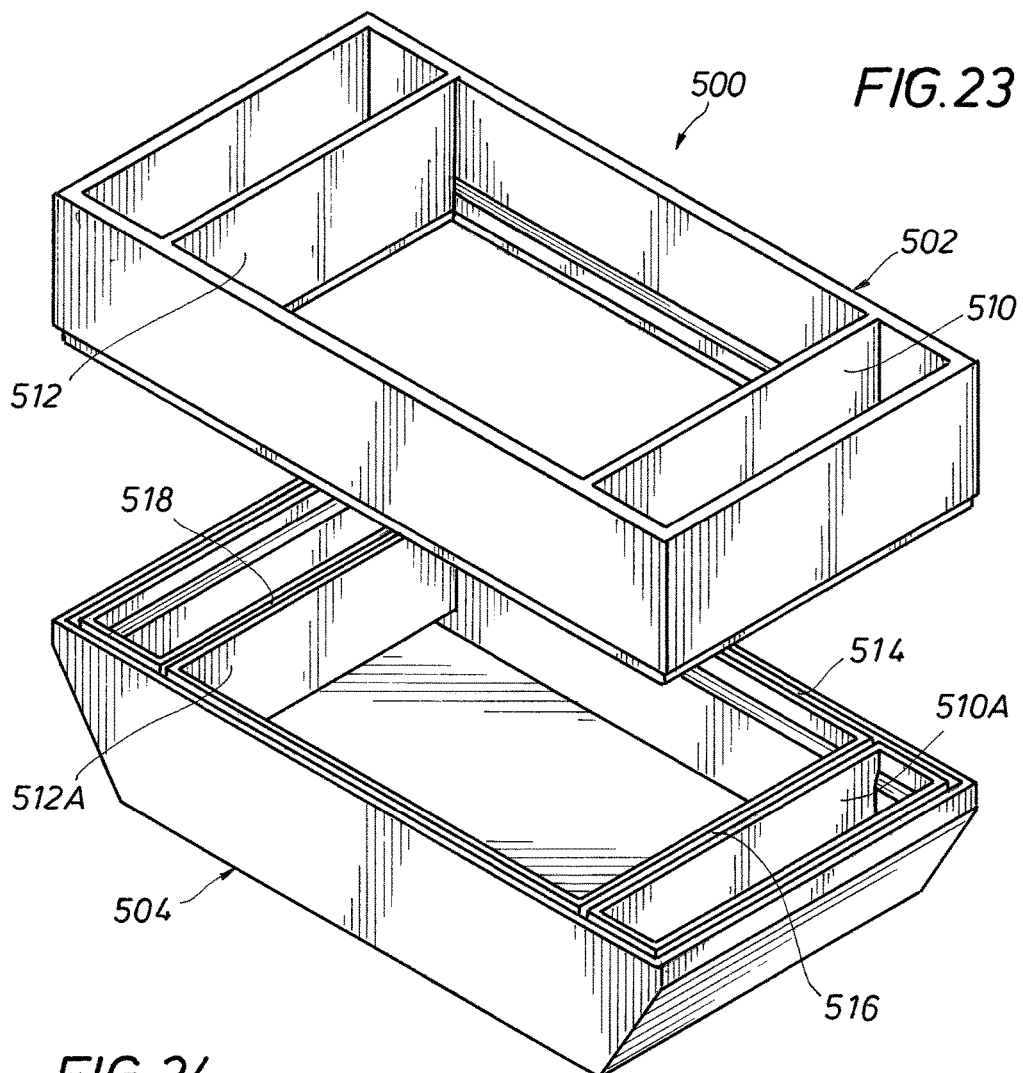
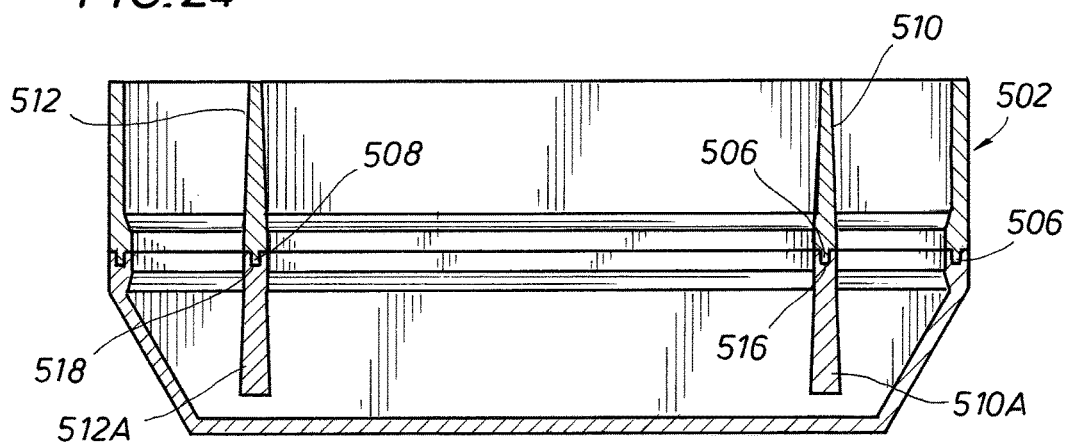

AEROBIC TREATMENT/CLARIFIER SYSTEM FOR USE IN AN AEROBIC WASTEWATER TREATMENT SYSTEM

CROSS REFERENCE TO RELATED APPLICATION

This application claims the priority of U.S. Provisional Application No. 61/300,321 filed on Feb. 1, 2010 the disclosure of which is incorporated herein by reference for all purposes.

BACKGROUND OF THE INVENTION

Field of the Invention

The present invention relates to aerobic wastewater treatment systems and, more particularly, to an aerobic treatment/clarifier tank for use in such system.

Description of Prior Art

Aerobic wastewater treatment systems (AWTS) are generally comprised of a pre-treatment tank wherein most of the solids settle out, an aerobic treatment/clarifier tank (AC tank) wherein wastewater from the pre-treatment tank is aerobically treated and clarified and a pump or holding tank into which clarified, aerobically treated wastewater flows from the AC tank for further disposal. There are numerous AWTS systems available, the details of operation and construction of which are well understood by those skilled in the art.

A typical AC tank comprises an aerobic chamber and a clarifying chamber, both of which are formed inside a housing, vessel or the like. For example, in one common form of AC tank, there is a generally cylindrical vessel or housing in which is disposed an inverted, frustroconical partition, the partition dividing the vessel into an aerobic chamber and a clarifying chamber, the clarifying chamber being within the partition. In AC tanks of this design, i.e., wherein there is a sloped wall defining at least a portion of the clarifying chamber, the slope angle of the sloped wall surface is important from an operational point of view. For example, if the slope angle is too shallow, undigested solids in the clarifying chamber will settle on the sloped wall surface, rather than falling under the force of gravity back to the aeration chamber where they can be further aerobically digested. Accordingly, regulatory agencies, as for example, state health departments, together with other parameters of the AC tank, specify a range of the slope angle of the sloped wall so as to minimize adhesion of the undigested solids on the sloped wall.

In theory, the steeper the slope angle of the sloped wall the less the problems encountered with settling of undigested solids on the sloped wall surface. However, slope angles which are too steep also present problems. Because the capacity requirements of the clarifying chamber and the aerobic treatment chamber are also relevant considerations, the slope angle of the sloped wall has to be maintained in a range, generally of from 50° to 70°, preferably from about 55° to about 65°, more preferably about 60°, lest the capacity balance between the clarifying chamber and the aerobic treatment chamber be outside acceptable parameters, thus interfering with the performance of the AC tank. Furthermore, a clarifying chamber having a steep slope angle requires an AC tank which has greater height than an AC tank having a sloped wall of a shallower angle, given that in either case, the AC tank meets the capacity parameter balance for the clarifying chamber and the aerobic treatment chamber.

As is well known to those in the industry, AWTS systems are typically buried in the ground such that the upper surface of the AWTS is substantially flush with grade, with the exception that access hatches into the system extend above grade for maintenance, inspection, etc. This means that if the AC tank has a sloped wall defining at least a portion of the clarifying chamber which is steep, to keep within an acceptable capacity ratio of the clarifying chamber and the aerobic treatment chamber, a deeper hole must be dug to accommodate the AWTS. This presents installation problems.

There are certain areas where the AWTS is to be installed, wherein rock; e.g., granite, is reached at a relatively shallow depth below the overburden. In these areas, an AWTS with an AC tank having a sloped wall, which has a steeper slope angle (making the tank taller), may necessitate jack hammering the bottom of the hole or excavation into which the AWTS is to be placed to remove the rock, e.g., granite, so that the AWTS can be installed with the top surface substantially at grade. Obviously, in these circumstances, an AWTS having an AC tank which is shorter and accordingly has a shallower slope angle is desirable since the total height of the AWTS may be such that it can be buried in the overburden above the rock subsurface without having to jack hammer or otherwise remove the rock. Yet in still other areas, a deeper hole can pose other problems. For example, on land which is adjacent water; e.g., islands, and wherein the elevation of the land relative to the adjoining body of water is relatively small; e.g., 3 ft. to 5 ft., the high level of the water table can exert hydrostatic force against the AC tank, which can cause the AWTS, in certain instances, to float. Furthermore, in many of these areas, where the soil is sandy, the sides of the hole or excavation into which the AWTS is to be placed will continue to collapse, meaning that an excavation of a much larger cross-sectional area must be made in order to obtain a substantially level surface upon which the AWTS can be set. Furthermore, in general, it is well known in the industry that installers do not like to install AWTS's requiring deep holes or excavations as opposed to AWTS's requiring shallow holes or excavations.

SUMMARY OF THE INVENTION

In one aspect, the present invention provides an AC system for use in an AWTS comprised of a structure providing at least one compartment, at least one aerobic treatment chamber and at least two clarifier chambers being disposed in the compartment, the structure being installable in a ground excavation as a one piece unit.

In another aspect, the present invention provides an AC system for use in an AWTS comprising a rigid, integral one-piece structure forming a first housing defining at least one aerobic treatment chamber, a second housing defining a first clarifying chamber, and a third housing defining a second, separate clarifying chamber, each of the clarifying chambers including a sloped wall, having an upper end and a lower end, the angle of the sloped wall being such that undigested solids present in the first and second clarifying chambers move from the upper end toward the lower end of the sloped walls so as to minimize deposit of undigested solids on the sloped walls of the first and second clarifying chambers, the first and second clarifying chambers having substantially equal capacity, and being operable in parallel, an inlet system for introducing wastewater into the at least one aerobic chamber, and an outlet system for removing clarified water out of the first and second clarifying chambers.

In a still further aspect, the present invention provides an AC system for use in an AWTS, comprising a maximum of two structural sections or portions which when installed in a ground excavation, provide a compartment for at least one aerobic treatment chamber and at least two clarifier chambers.

BRIEF DESCRIPTION OF DRAWINGS

FIG. 23 is a perspective view of another embodiment of the AC system of the present invention.

FIG. 24 is a cross-sectional view of the embodiment shown in FIG. 23 in an assembled condition.

DESCRIPTION OF THE PREFERRED EMBODIMENTS

While the invention will be described with reference to one or more aerobic chambers and two clarifying chambers, it is to be understood that there could be more aerobic chambers and one or more clarifying chambers.

The terms "rigid, one-piece," "integral one-piece" or "one-piece unit" as used herein, refer to a structure which can be monolithic; e.g., formed of concrete, fiberglass or similar material using a mold or the like, or several individual structures which can be separately formed and rigidly adjoined as an integral, one piece unit; e.g., by bonding structures together to form the various chambers, or by mechanically, rigidly connecting the structures forming the various chambers to form a one piece unit, one of the goals being that minimum assembly is required at the site where the AC system is to be installed. In this regard, it is a feature of one aspect of the present invention that the AC system of the present invention, once the proper excavation has been made, can be placed in the excavation as a one piece unit. Additionally, since the AC system of the present invention is a one-piece unit, it can be more easily transported than multiple, large structures.

Figure 1:
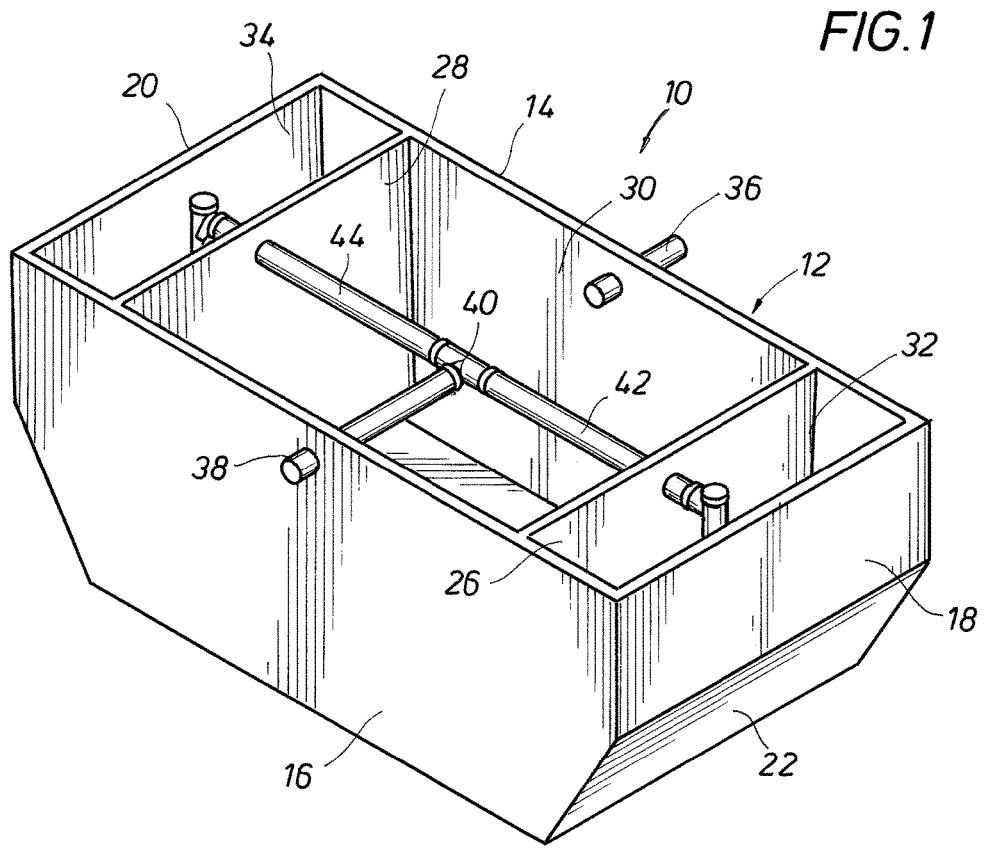
FIG. 1 is a perspective view of one embodiment of an AC system of the present invention.
Figure 2:
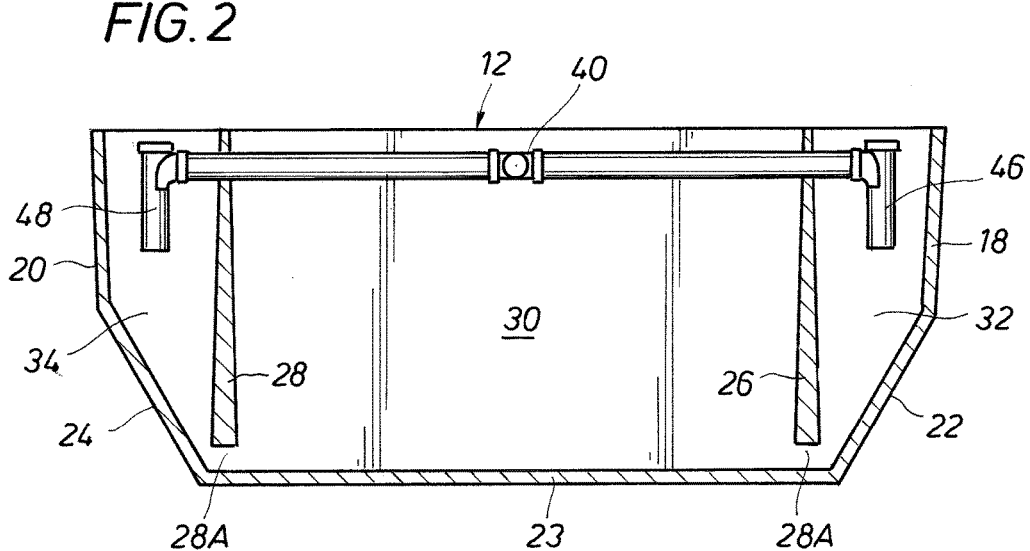
FIG. 2 is a side, elevational view of the AC tank system shown in FIG. 1.
Figure 3:
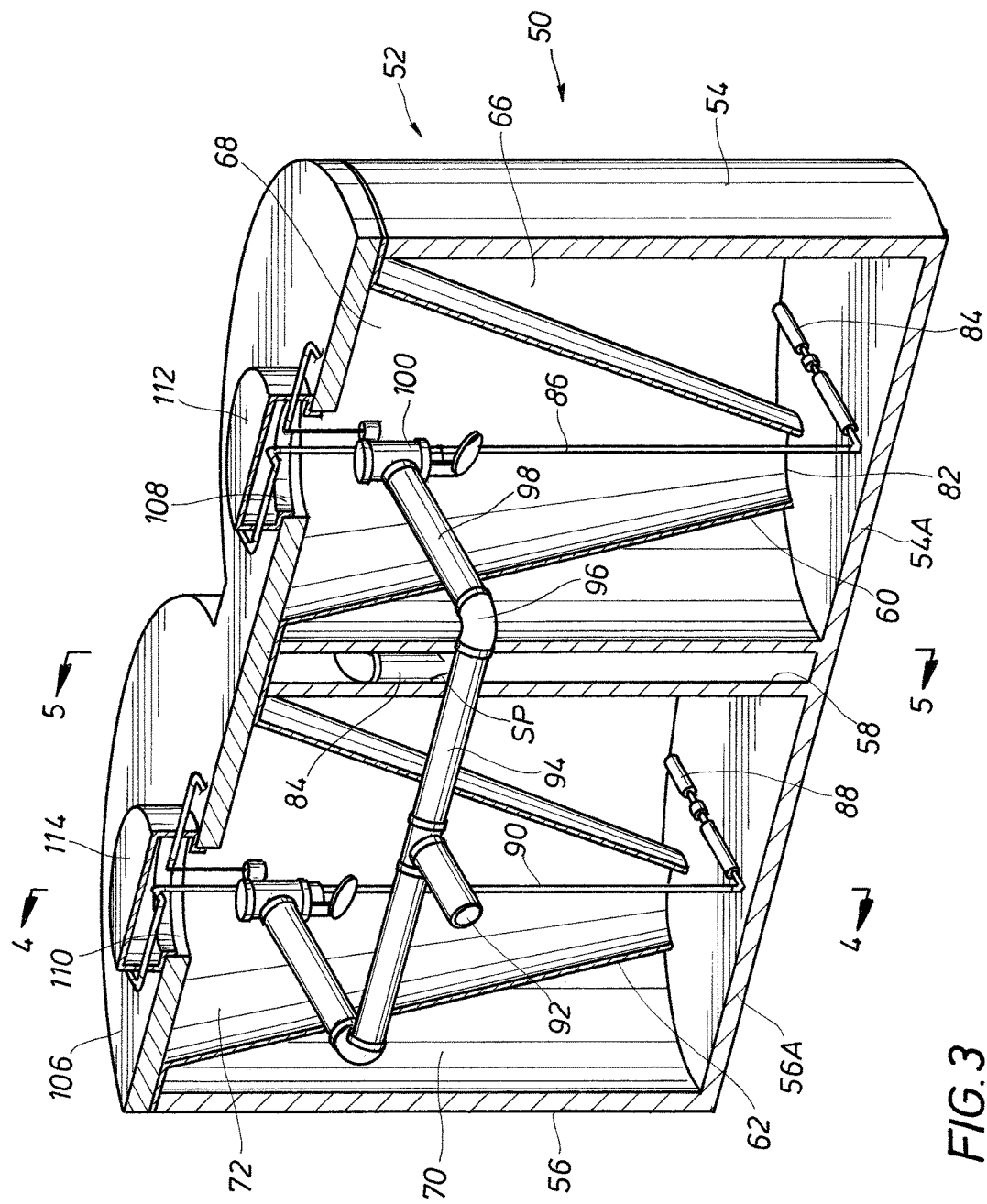
FIG. 3 is a perspective view, partially in section, of another embodiment of the AC system of the present invention.

Referring first to FIGS. 1 and 2, there is shown one embodiment of the AC system of the present invention. The AC system shown in FIGS. 1 and 2 is constructed of concrete using a suitable mold to form a generally monolithic structure which provides a compartment. The AC system, shown generally as 10, comprises a housing 12 having a first sidewall 14, a second sidewall 16, a first end-wall 18, a second end-wall 20 and a bottom wall 23, the compartment being formed by walls 14, 16, 18, 20 and 23. End-wall 18 has a sloped portion 22, while end-wall 20 has a sloped portion 24. Generally sloped portions 22 and 24 are at an angle of about 60° but can be from 50° to 70°, preferably 55° to 70°. A first partition 26 extends between sidewalls 14 and 16, can be monolithically formed with structure 12 and, as seen in FIG. 2, has a lower end spaced from bottom wall 23. A second partition 28, likewise monolithically formed with structure 12, extends between sidewalls 14 and 16 and is proximate end-wall 20, partition 28, like partition wall 26, being spaced from bottom wall 23.

It can thus be seen that there are essentially formed three chambers by structure 12. A first chamber 30 formed by partitions 26 and 28 and at least partially by sidewalls 14 and 16, a second chamber 32 formed by end-wall 18, parts of sidewalls 14 and 16, and partition 26, and a third chamber 34 formed by end-wall 20, partition 28 and portions of sidewalls 14 and 16. There is an inlet 36 formed by a conduit 36 that opens internally of chamber 30, an outlet 38, which is connected by a T 40 to branch pipes 42 and 44, which extend respectively into chambers 32 and 34, and are connected to outflow assemblies 46 and 48 disposed in chambers 32 and 34, respectively.

Chamber 30 forms an aeration chamber in AC system 10, while chambers 32 and 34 form clarifying chambers. In operation, wastewater from a pre-treatment tank (not shown) where large solids settle out is introduced into chamber 30, through inlet 36. As noted, chamber 30 is an aerobic chamber and, while not shown, will have disposed therein a source of an oxygen-containing gas; e.g., air, oxygen, etc., which aerobically digests solids in the wastewater introduced into aerobic chamber 30. As can be seen with reference to FIG. 2, there is a gap 26A between bottom wall 23 and the lower end of partition 26, and a gap 28A between the lower end of partition 28 and bottom wall 23. In operation, aerobically digested water from chamber 30 flows through gaps 26A and 28A to clarifier chambers 32 and 34, respectively, clarified water being removed from chamber 32, via outflow assembly 46, branch pipe 42, T 40 and common, outlet 38, clarified water being removed from clarifying chamber 34 via outflow assembly 48, pipe 44, T 40 and common outlet 38; i.e., clarifier chambers 32 and 34 are connected to the same, outlet 38.

In a preferred embodiment, the system shown in FIGS. 1 and 2 as well as the other systems described herein, have a single inlet and a single outlet. Further, while in the embodiment shown in FIGS. 1 and 2, there is shown a monolithic, one piece structure, as will be seen hereafter, according to another aspect of the present invention, the structure of FIGS. 1 and 2 can be made in a maximum of two portions or sections.

Referring now to FIGS. 3-7, there is shown another embodiment of the AC system of the present invention. The AC system of FIGS. 3-7, shown generally as 50, comprises a structure 52, formed of concrete, fiberglass, etc., preferably fiberglass, in a suitable manner. Structure 52 is comprised of two structural sections 54 and 56, in each of which is formed a compartment, each of the compartments containing an aeration chamber and a clarifying chamber. The compartment in structural portion 54 is formed by a generally cylindrical wall in combination with a bottom wall 54A, while the compartment structural portion 56 is formed by a generally cylindrical wall in conjunction with a bottom wall portion 56A. Although not shown, structural sections 54 and 56 can be connected together in the manner shown in FIG. 21 and/or described in U.S. Pat. No. 6,358,411, D438932, D444535 and D445869, all of which are incorporated herein by reference for all purposes. In other words, the two structural sections 54 and 56 would typically be formed of fiberglass, made in individual sections and then bonded together to form essentially a monolithic structure by means of the gusset connections. An inverted frustoconical partition 60 is disposed in the compartment formed by structural portion 54, while a second inverted frustoconical partition 62 is disposed in the compartment formed by structural portion 56. The wall of portion 54, in conjunction with partition 60, forms a first aeration chamber 66, and a first clarifier chamber 68, within partition 60, while partition 62 in conjunction with the wall of portion 56 forms a second aerobic chamber 70, and a second clarifying chamber 72 within partition 62.

Figure 4:
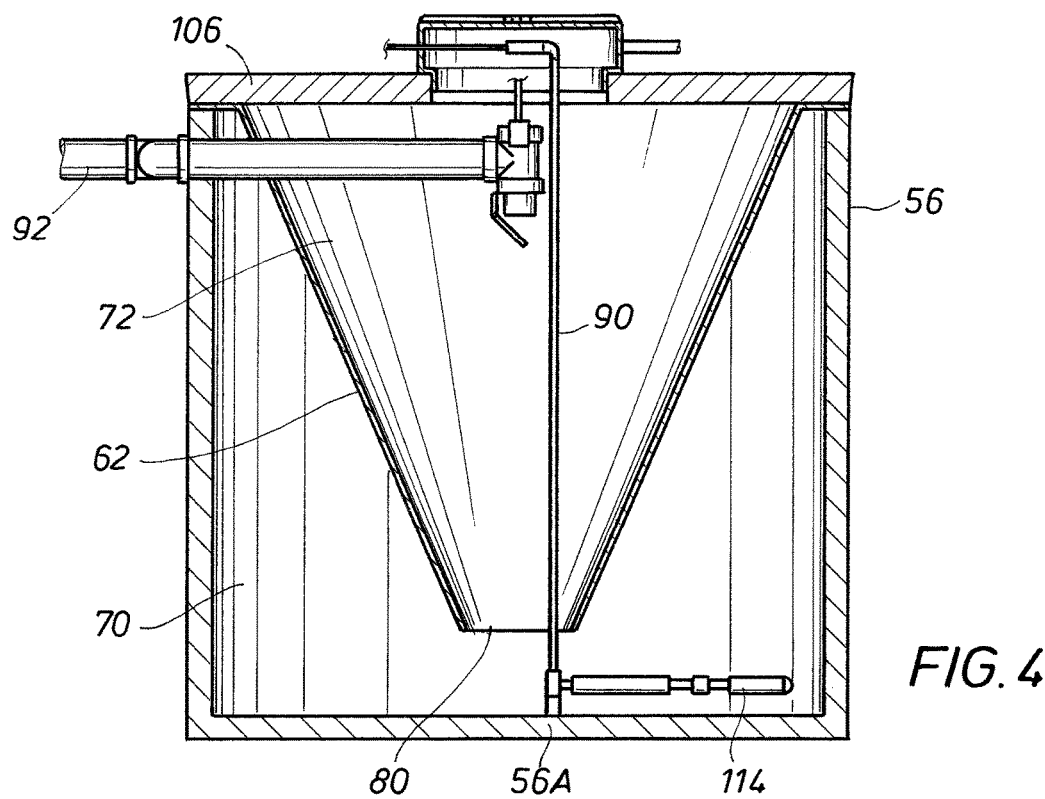
FIG. 4 is is a side, elevational view taken along the lines 4-4 of FIG. 3.
Figure 5:
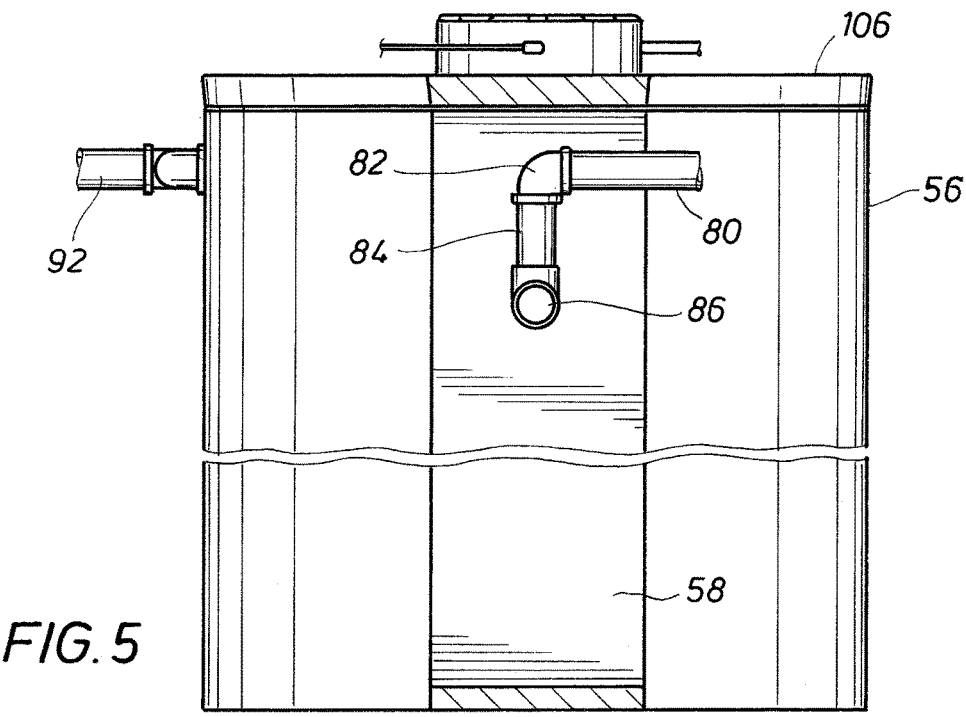
FIG. 5 is a cross-sectional view taken along the lines 5-5 of FIG. 3.
Figure 6:
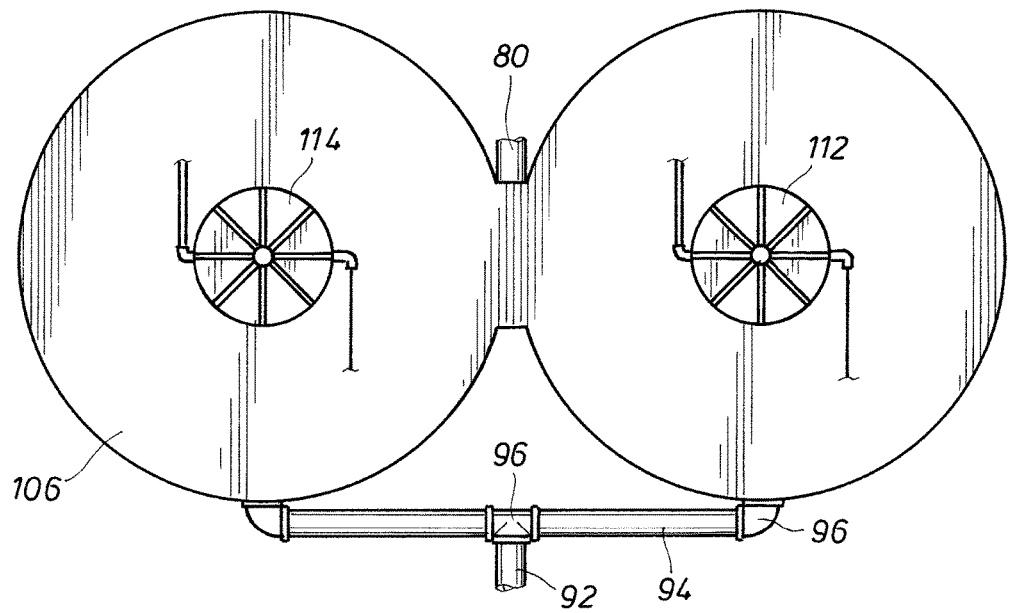
FIG. 6 is a top plan view of the AC system shown in FIG. 3.

As best seen in FIG. 4, partition 62 has a downwardly opening mouth 80, which is spaced from the bottom wall 56A of section 56. In like fashion, partition 60 has a mouth 82 which is spaced from the bottom wall 54A of section 54.

It is worth noting that while all of the embodiments of the present invention have or are being described with respect to a gravity flow system in that undigested solids in the clarifier fall out of the clarifiers via the sloped wall(s) and are introduced back into the aerobic chamber(s) for further digestion, it is not so limited. It is to be understood that a gravity flow system is not absolutely necessary, and in certain instances gas lift apparatus or other mechanical systems could be employed to return undigested solids falling from the clarifiers back into the aerobic chamber(s).

A first aerator 84 is connected by line 86 to a source of an oxygen-containing gas (not shown) whereby an oxygen-containing gas can be introduced into aeration chamber 66 to aerobically digest solids as discussed above with reference to the embodiment of FIGS. 1 and 2. Likewise, a second aerator 88 is connected by a line 90 to a source of an oxygen-containing gas (not shown), aerator 88 serving to introduce an oxygen-containing gas into aerobic chamber 70.

The AC system 50 of FIGS. 3-7 has an inlet system comprised of an inlet pipe 80, an elbow 82, a T-connector 84, a first conduit 86 opening into chamber 66, and a second conduit 88 opening into aerobic chamber 70. As can be seen particularly with reference to FIGS. 3, 5 and 6, the inlet system is disposed in the common wall 58.

AC system 50 also includes an outlet system comprised of an outlet pipe 92, a first branch line 94, an elbow 96, a second branch line 98, and an outflow fitting 100. As seen, the outlet system described above is with respect to clarified water being removed from clarifying chamber 68. As can be seen from the drawings, a virtually identical piping system is connected to outlet 92 for the removal of water from clarifying chamber 72. In any event, it is to be observed that there is an outlet 92 for clarified water from both chambers 68 and 72.

A lid 106 overlays structure 52 of AC system 50, lid 106 having an opening 108 into clarifying chamber 68, and an opening 110 into clarifying chamber 72, the openings 108 and 110 being equipped with hatches 112 and 114, respectively for maintenance, etc.

Figure 7:
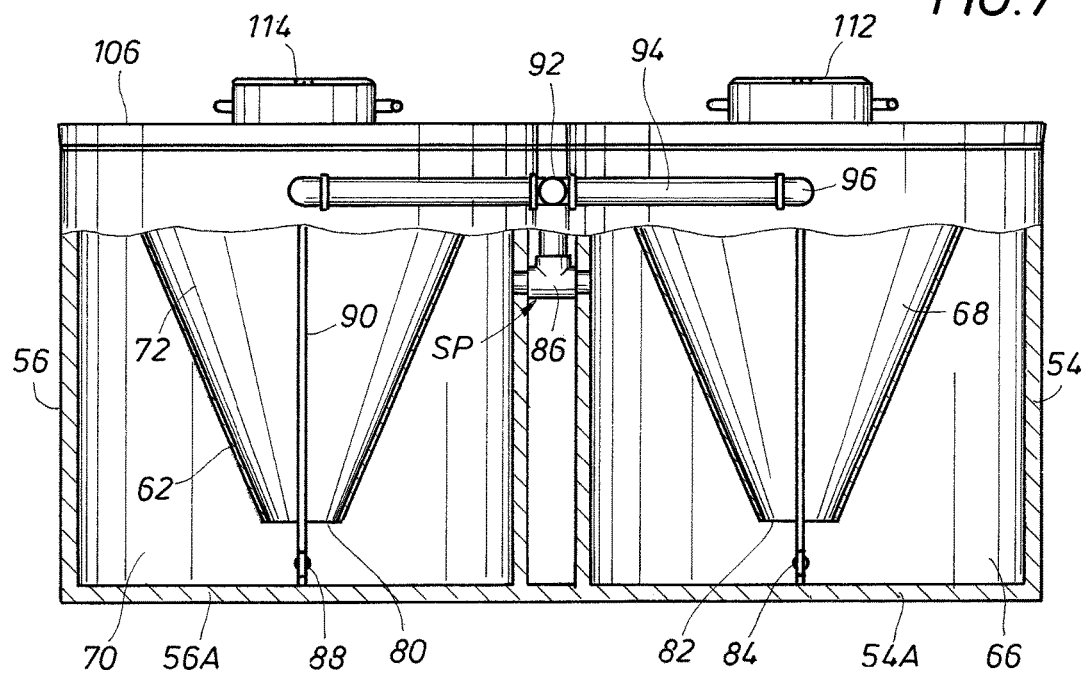
FIG. 7 is a cross-sectional, elevational view of the AC system shown in FIG. 3.
Figure 8:
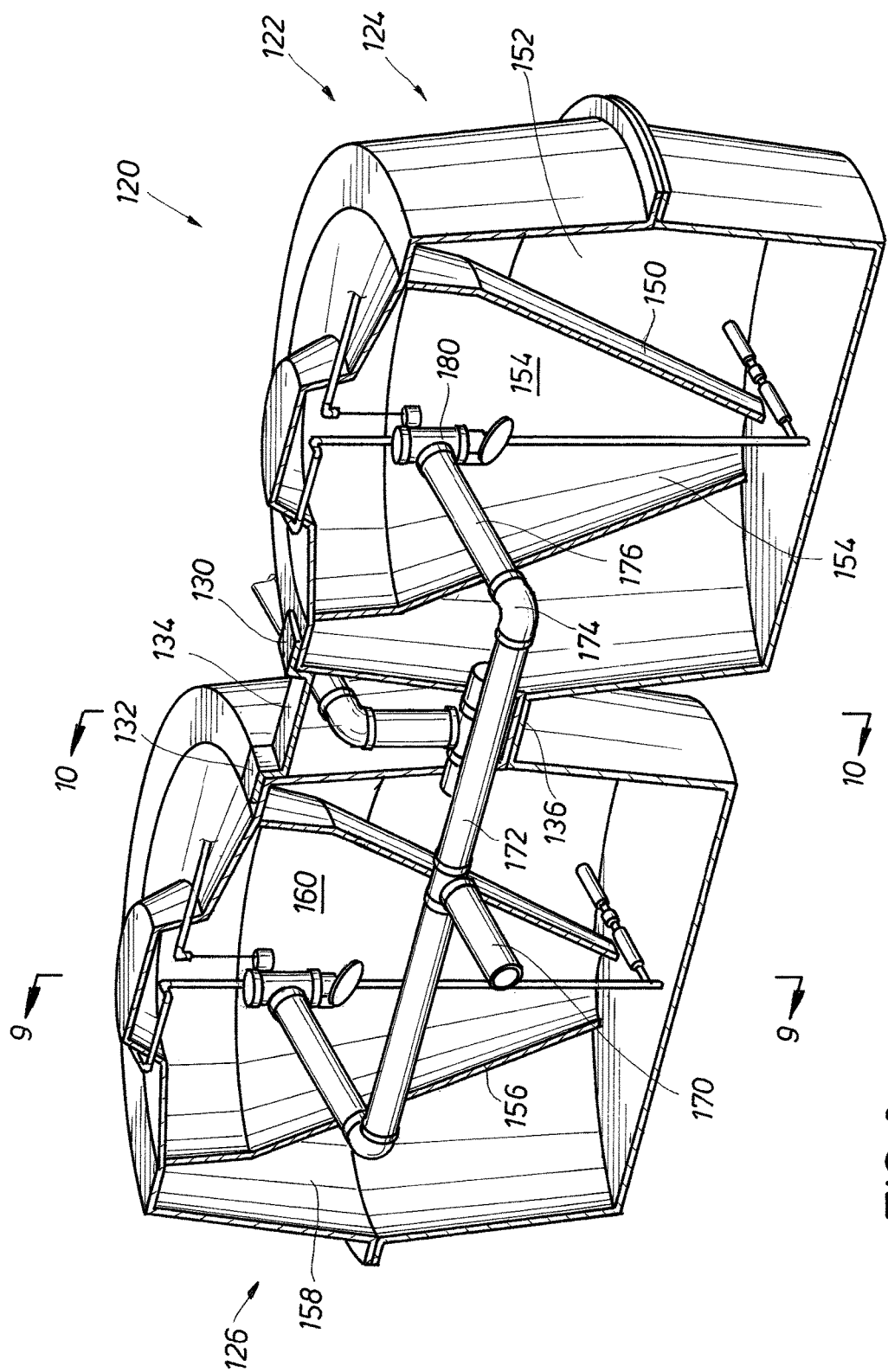
FIG. 8 is a perspective view, partially in section, of another embodiment of the AC of the present invention.
Figure 9:
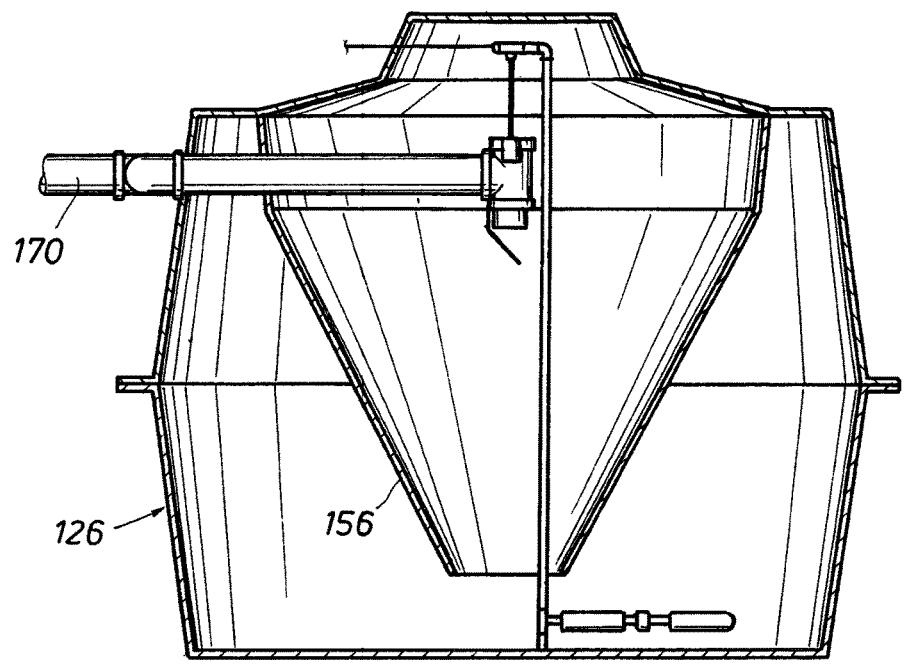
FIG. 9 is a cross-sectional view taken along the lines 9-9 of FIG. 8.
Figure 10:
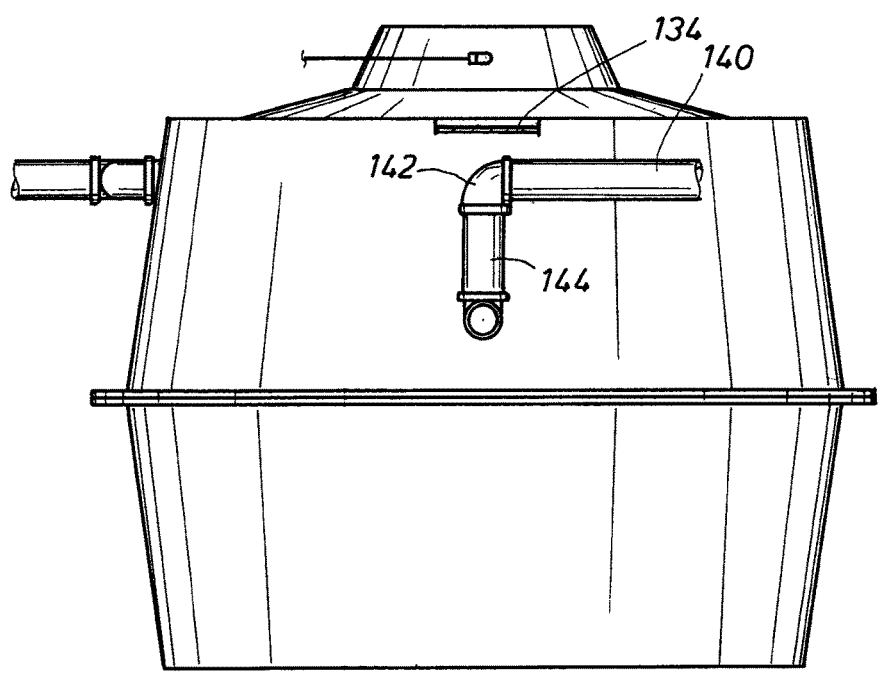
FIG. 10 is a cross-sectional view taken along lines 10-10 of FIG. 8.
Figure 11:
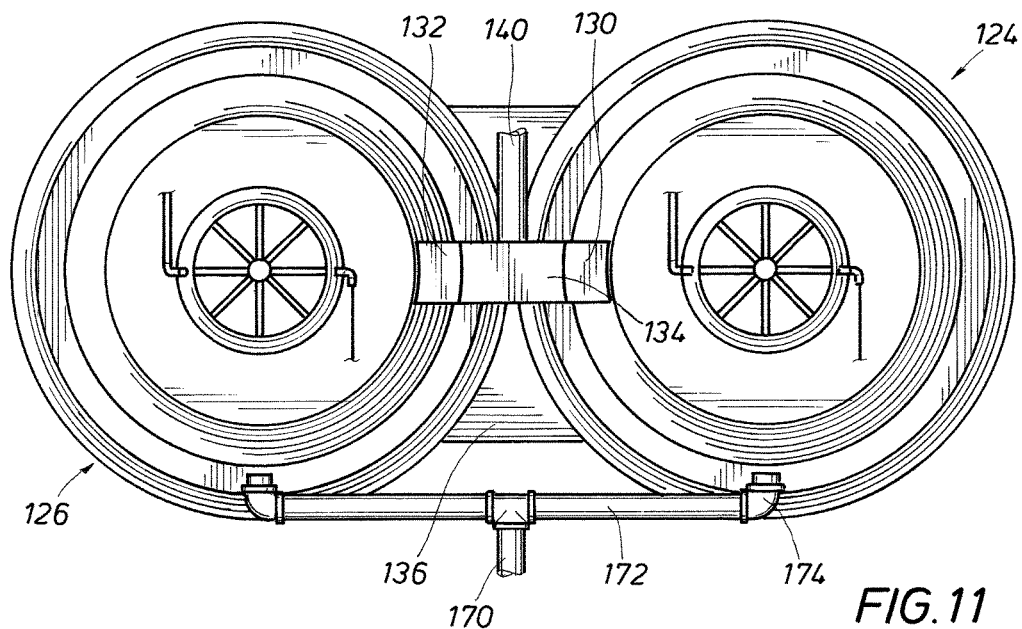
FIG. 11 is a top plan view of the AC system shown in FIG. 8.
Figure 12:
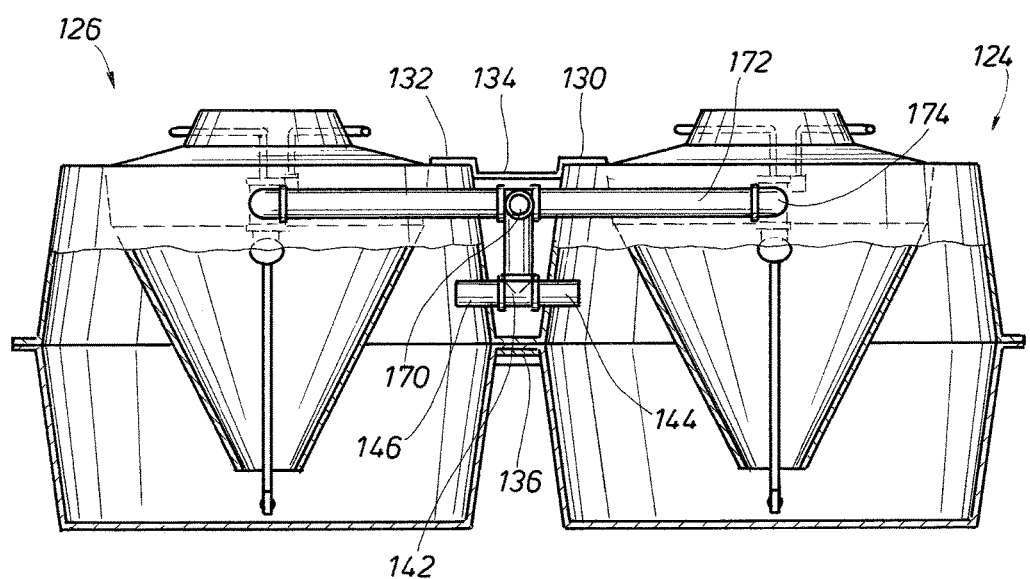
FIG. 12 is a cross-sectional, elevational view of the AC system shown in FIG. 8.

In operation, wastewater from a pre-treatment tank enters a system through inlet 80, and flows substantially equally into aerobic chambers 66 and 70. In this regard, and as schematically shown in FIG. 7, there is a flow splitter SP which can take many different forms, and which ensures that in-flow through inlet 80 is substantially equally diverted into chambers 66 and 70. As is well known and as is described above with respect to the embodiment of FIGS. 1 and 2, a source of oxygen gas (not shown) flows through aerators 84 and 88 to aerobically digest solids in the wastewater in aerobic chambers 66 and 70. Clarified water is removed from clarifying chambers 68 and 72 through the outlet system described above, undigested solids in the clarifying chambers falling by gravity through the mouths 82 and 80 of partitions 60 and 62, to be returned to the aerobic chambers for further digestion.

It will be appreciated that the plumbing arrangement of the outlet system shown with respect to the embodiment of FIGS. 3-7, could also be employed in the case of the embodiment shown in FIGS. 1 and 2; i.e., outlets from the chambers 32 and 34 could pass through wall 16, and then be connected to a T by suitable piping and ultimately to an outlet pipe or the like.

Turning now to FIGS. 8-12, there is shown another embodiment of the present invention wherein the integral, one-piece unit or structure is formed by mechanically connecting various structures together to form compartments for the resulting aerobic treatment/clarifier chambers. The AC system, shown generally as 120 in FIGS. 8-12 has a structure 122 comprised of first tank assembly 124 and second tank assembly 126. Tank assemblies 124 and 126 are of the type disclosed in U.S. Pat. No. 7,178,677, incorporated herein by reference for all purposes. The tank assemblies 124 and 126 in the embodiment shown in FIGS. 8-12 are generally of fiberglass or a similar construction, tank assemblies 124 and 126 being adjoined into an integral, one piece unit by means of a first bracket 128, which is generally U-shaped having a first flange portion 130, mechanically affixed to tank assembly 124, and a second flange 132 mechanically affixed to tank assembly 126 (see U.S. Pat. No. 7,294,261, incorporated herein by reference for all purposes.) Flanges 130 and 132 are adjoined by way of a web portion 134. There is also a second bracket 136, which is mechanically attached to tank assemblies 124 and 126 in accordance with the disclosure of U.S. Pat. No. 7,294,261.

AC system 120 is provided with an inlet 140, which is connected to a T 142, which includes a flow diverter shown schematically as 142, which substantially splits the flow into equal volumes; one portion passing through conduit 144, the other portion passing through conduit 146. As can be seen, disposed inside tank assembly 124 is an inverted frustoconical partition 150, which divides tank system 124 into an aerobic chamber 152 and a clarifying chamber 154. In similar fashion, an inverted, frustoconical partition 156 disposed in tank system 126 forms a aerobic chamber 158 and a clarifying chamber 160. In other words, flow entering through inlet 140 is equally split, a portion being diverted via T/flow diverter 142 through conduit 144 into aerobic chamber 152, a second, substantially equal portion being introduced through T/flow diverter 142 through conduit 146 into aerobic chamber 158.

As can be seen from FIGS. 8-12, there is an outlet 170, which is connected by a branch line 172 and elbow 174, a branch line 176 and an outflow fitting 180 to clarifying chamber 154, whereby clarified water can be removed from chamber 154, undigested solids falling through the mouth of partition 150 back into aerobic chamber 152 for further digestion. As can be seen, a similar piping system connects outlet 170 to clarifying chamber 160.

Figure 13:
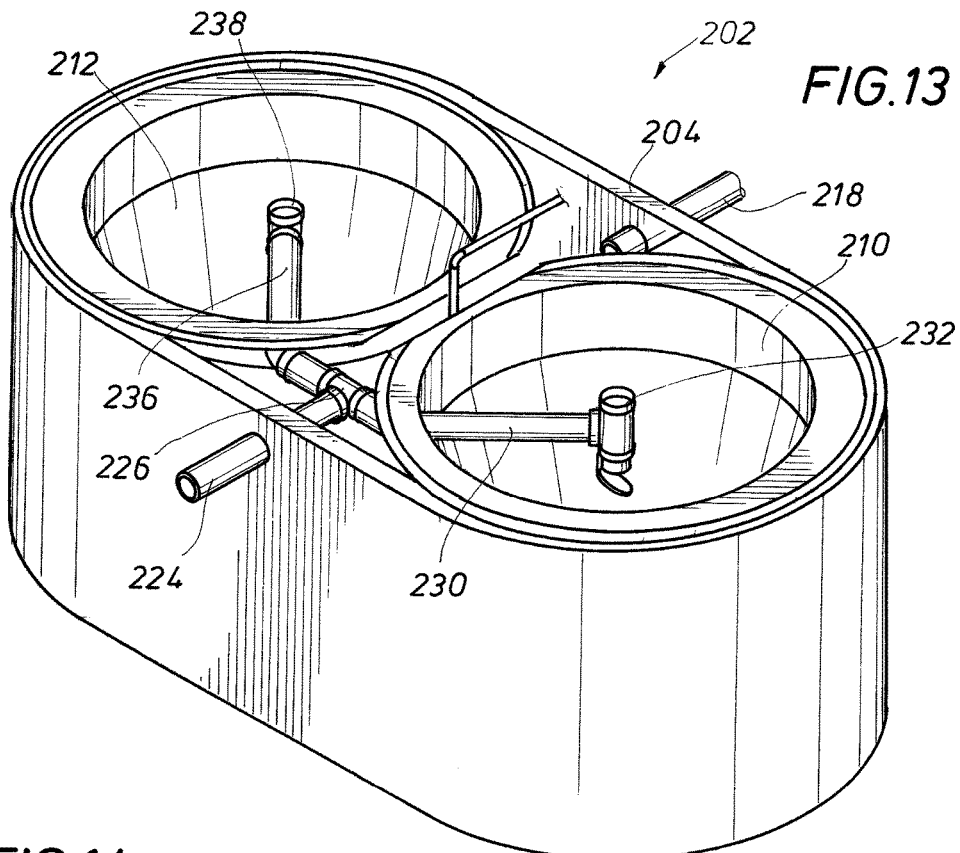
FIG. 13 is a perspective view of another AC system of the present invention.
Figure 14:
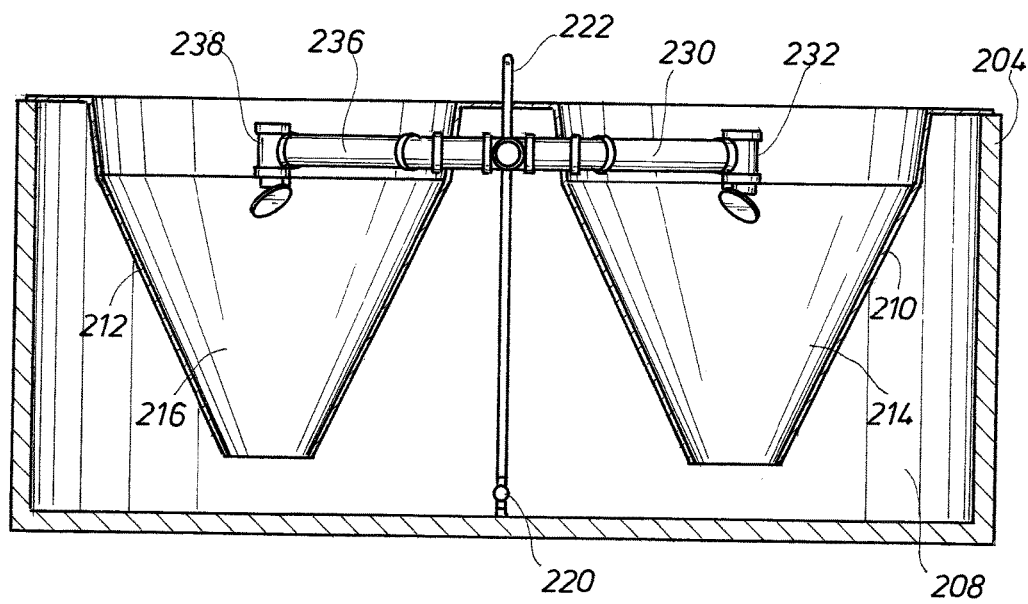
FIG. 14 is a side elevational view, partly in section, of the AC system shown in FIG. 13.
Figure 15:
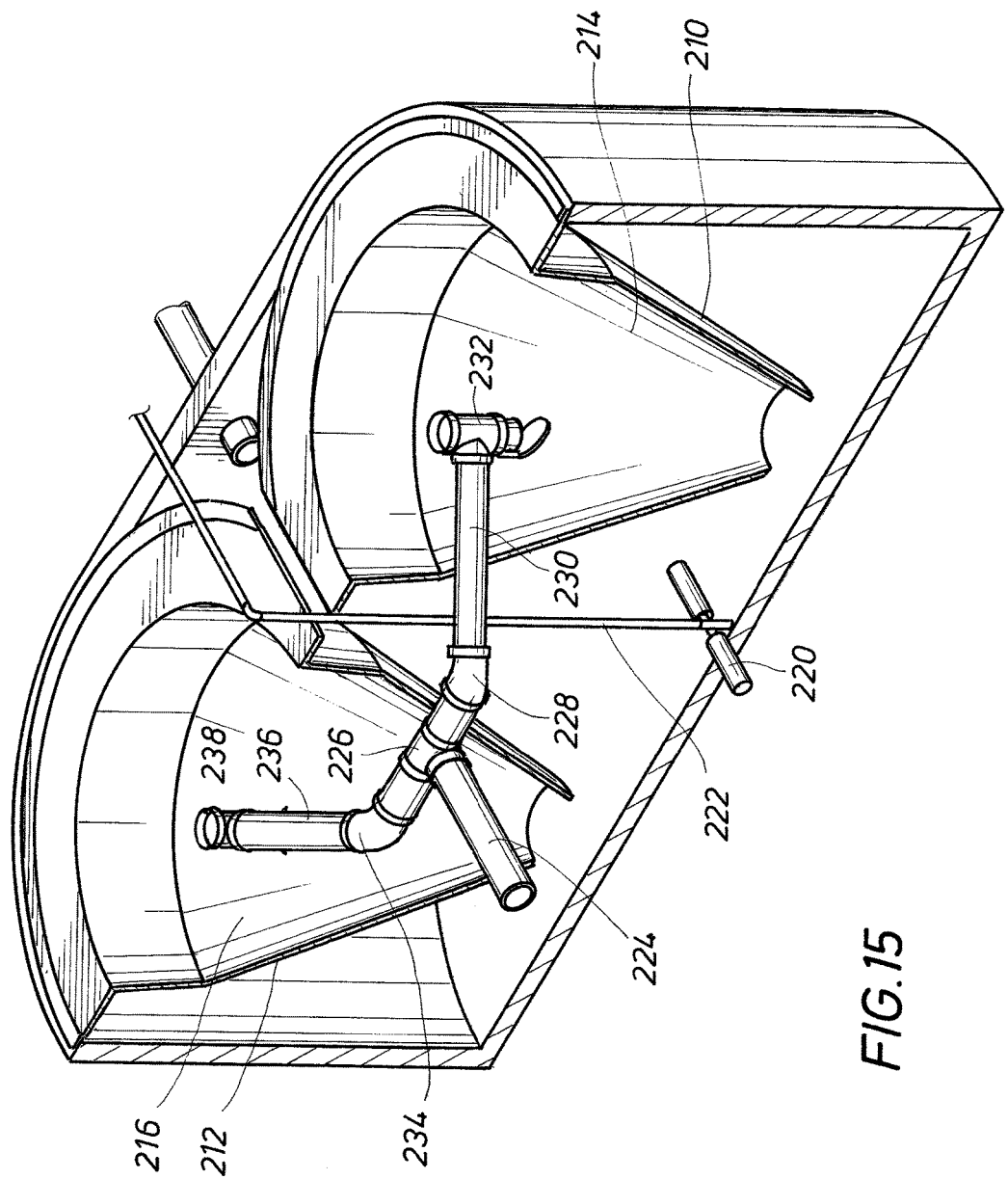
FIG. 15 is a view similar to FIG. 13 but with portions broken away for clarity.

Referring now to FIGS. 13, 14 and 15, there is shown still another embodiment of the present invention. The AC system shown generally as 202 in FIGS. 13-15, is of a so-called racetrack design, is monolithic, and is formed of concrete or a similar pourable or castable material. AC system 202 has a peripheral, racetrack-shaped wall 204 when viewed in plan view, and a bottom wall 206 forms a compartment in which the aerobic treatment/clarifier chambers are formed. In this case the peripheral wall 204, in conjunction with bottom wall 206, form a single aeration treatment chamber 208. Disposed in chamber 208 is a first inverted, frustoconical partition 210, and a second inverted, frustoconical partition 212. Partitions 210 and 212 forming clarifying chambers 214 and 216, respectively. Wastewater from a pre-treatment tank flows through inlet 218 into aerobic treatment chamber 208. Disposed in aerobic chamber 208 is an aeration/diffuser assembly 220 connected by a line 222 to a source of an oxygen-containing gas (not shown). An outlet 224 is connected via a T 226, an elbow 228, and a line 230 to an outflow conduit 232 disposed in clarifying chamber 214. In like fashion, T-fitting 226 is connected via an elbow 234, a conduit 236, and an outflow assembly 238 to clarifying chamber 216. Although not shown, it will be understood that there would be a lid overlying and following the outline of peripheral wall 204. Like the embodiment of AC system shown in FIGS. 1 and 2, AC system 202 shown in FIGS. 13-15 is comprised of a monolithic structure, a single aeration chamber, and two clarifying chambers, there being a single inlet into the single aerobic chamber and a single outlet from the clarifying chambers.

Figure 16:
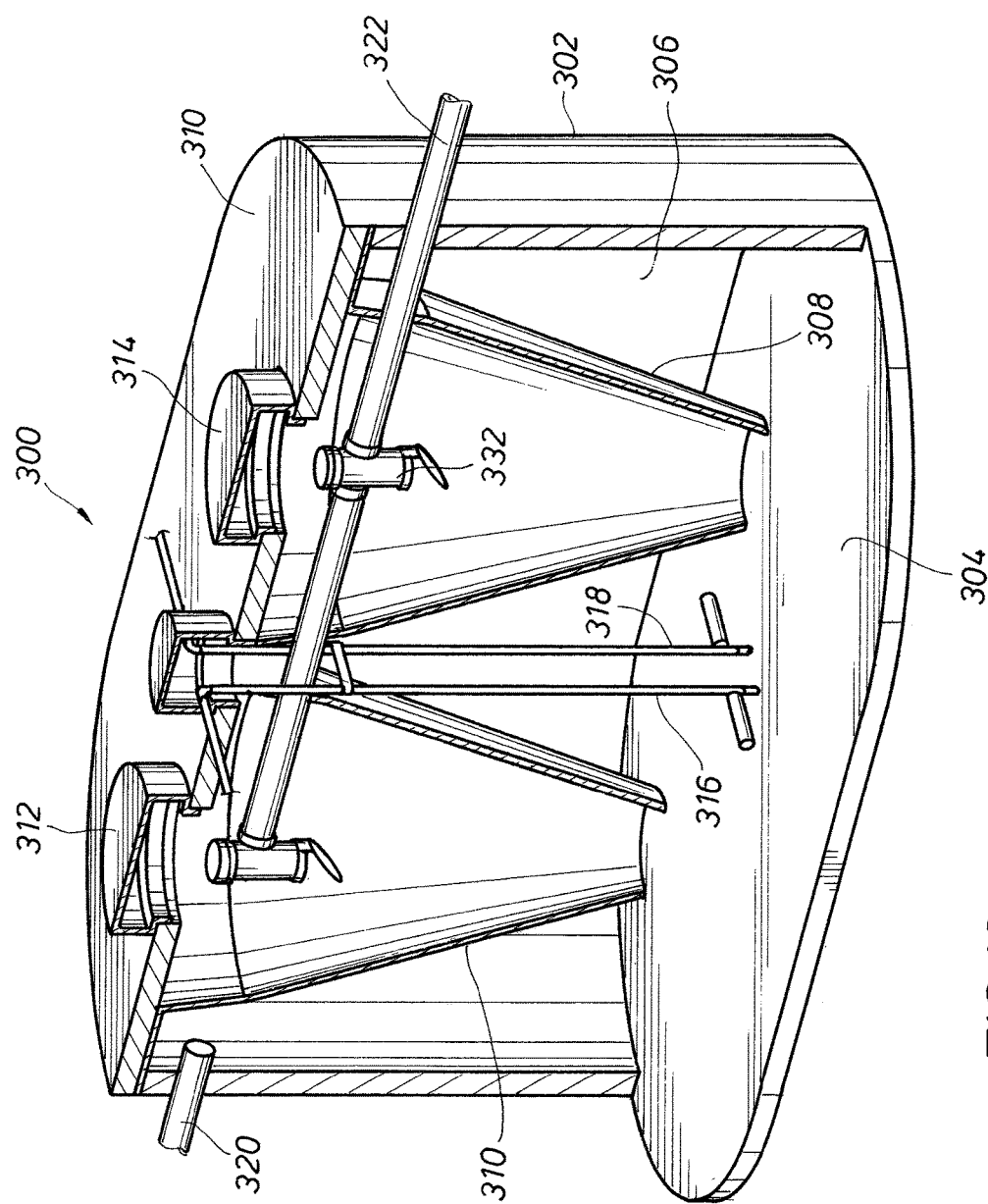
FIG. 16 is a perspective view, partly in section, of another embodiment of the AC system of the present invention.
Figure 17:
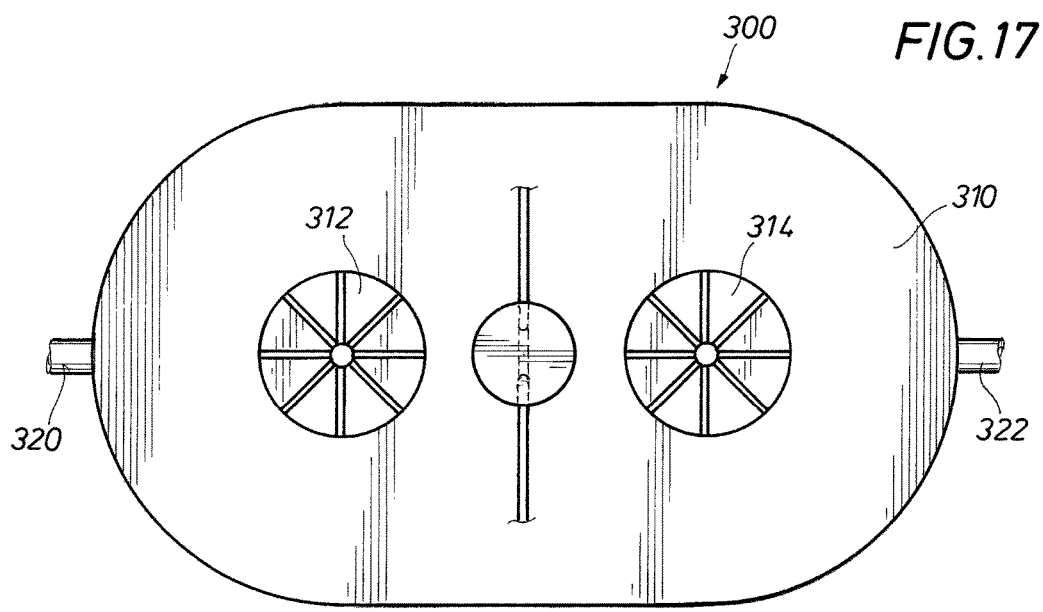
FIG. 17 is a top, plan view of the embodiment shown in FIG. 16.
Figure 18:
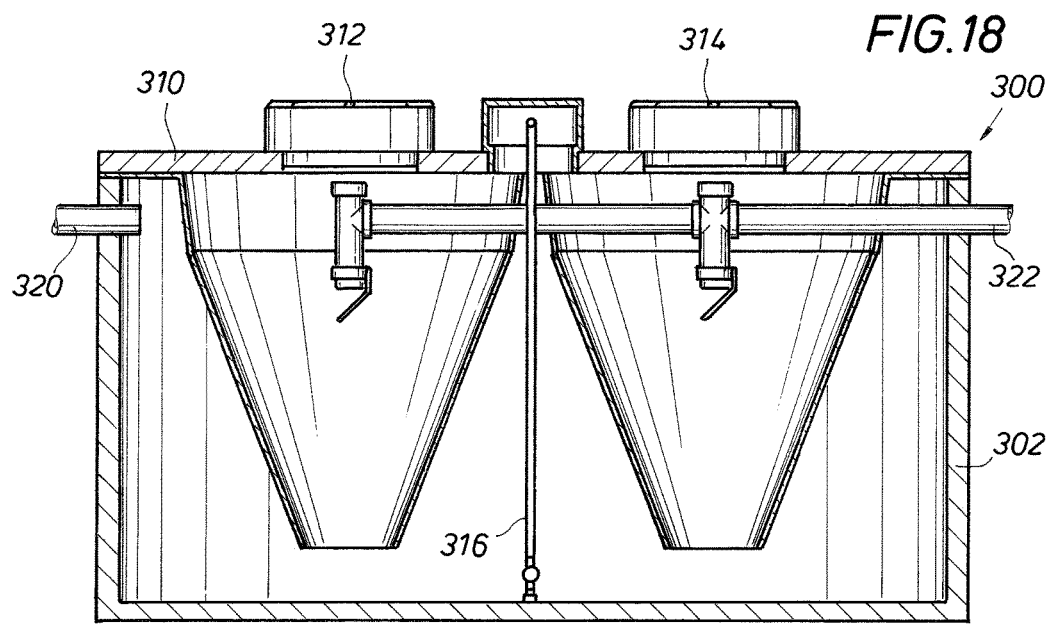
FIG. 18 is a side, elevational view, partly in section, of the AC system shown in FIG. 16.

Referring now to FIGS. 16, 17 and 18, there is shown another embodiment of the AC system of the present invention. The AC system shown generally as 300, is similar to that shown in FIG. 15 in that it is of a racetrack design and comprises a peripheral wall 302 and a bottom wall 304 defining a compartment 306. As a practical matter, the only real differences between the embodiments shown in FIGS. 13-15 and that shown in FIGS. 16-18 is the plumbing. AC system 300, like the AC system shown in FIGS. 13-15 has a first, inverted frusto-conical partition through it and a second inverted, frusto-conical partition 310 in each of which there is formed a clarifying chamber. In the embodiment of FIG. 300, the peripheral wall 302, in conjunction with the bottom wall 308 forming a single aeration chamber 306. AC system 300 has a top cover 310 with hatches 312 and 314. Disposed in aeration chamber 306 are a pair of air diffusers 316 and 318, as described above with respect to the other embodiments. A single inlet 320 introduces wastewater to be treated into aerobic treatment chamber 306, while a single outlet 322 is plumbed so as to receive water from both clarifier chambers formed by partitions 308 and 310.

Figure 19:
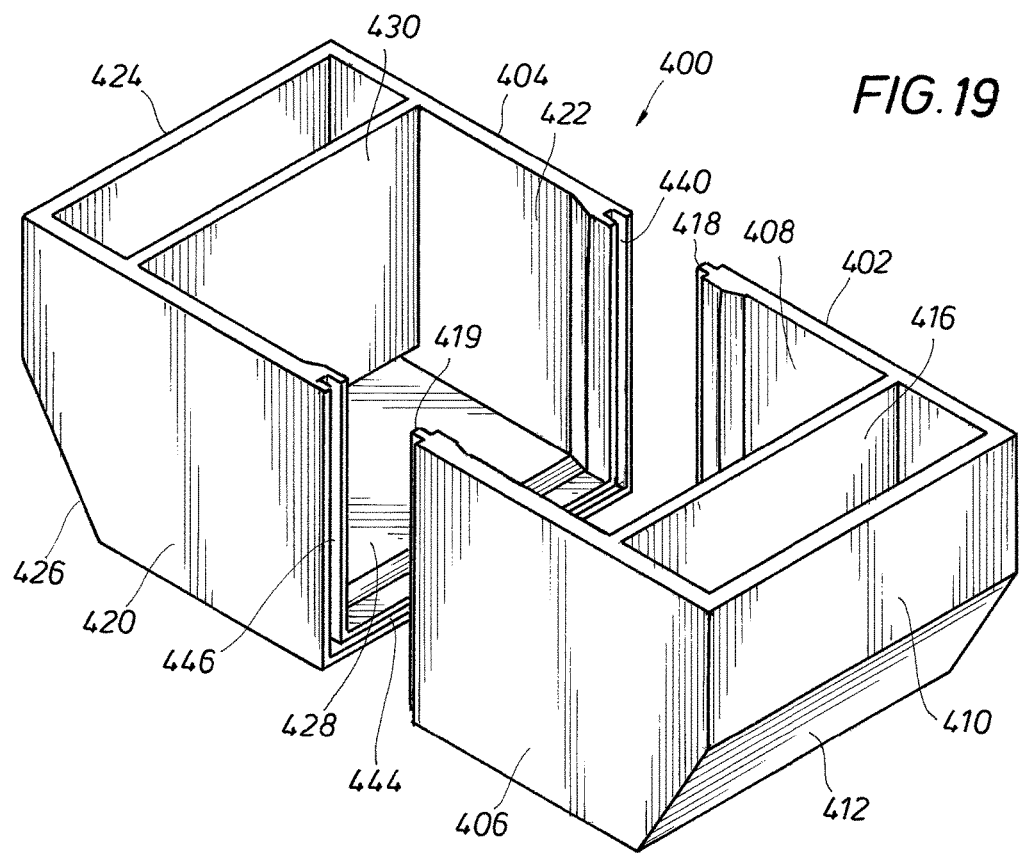
FIG. 19 is a perspective view of another embodiment of the AC system of the present invention.
Figure 20:
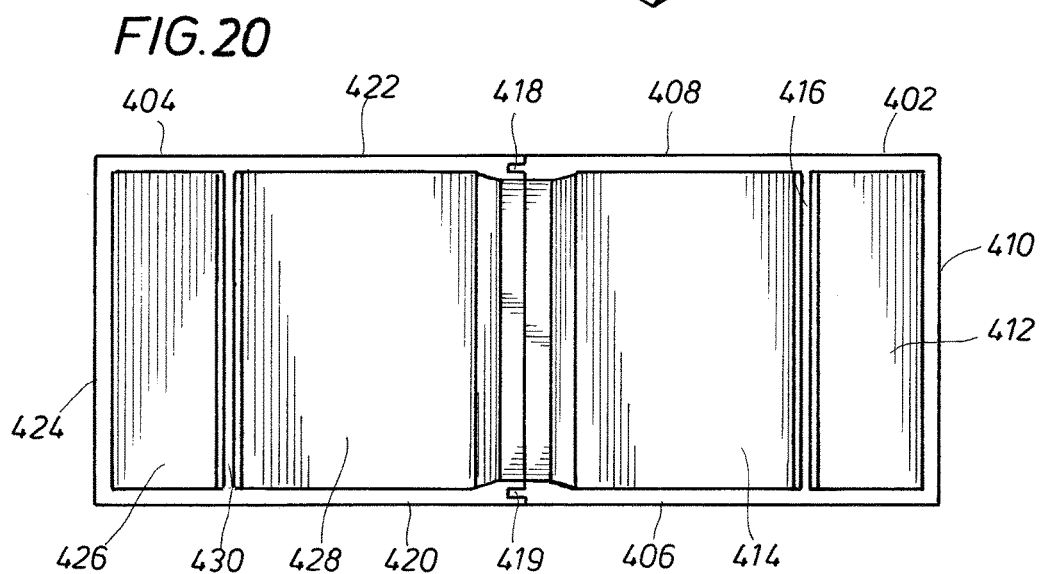
FIG. 20 is a side, elevational view of the embodiment of the AC system shown in FIG. 18 in an assembled condition.

Referring now to FIGS. 19 and 20, there is shown another embodiment of the AC system of the present invention. The embodiment shown in FIGS. 19 and 20 is similar to that shown in FIGS. 1 and 2, with the exception that the AC system shown in FIGS. 19 and 20 comprises two structures which when joined together as shown in FIG. 20 form a single compartment. The AC system of FIGS. 19 and 20, shown generally as 400, comprises a first section 402 and a second section 404. First section 402 has a first side wall 406, a second, opposed side wall 408, an end wall 410 having a sloped portion 412, and a bottom wall 414, a partition 416 being disposed between side walls 406 and 408, and generally parallel to the straight portion of end wall 410. Section 402 has tongues 418 and 419, which project from side walls 408 and 406, respectively, in addition to a tongue (not shown) projecting from bottom wall 414.

Second section 404 has a first side wall 420, second opposed side wall 422, an end wall 424 having a sloped portion 426 and a bottom wall 428, a partition 430 being disposed between side walls 420 and 422. Section 404 also has a series of grooves 440, 444 and 446 formed in the ends of walls 422, 428 and 420, respectively, the grooves receiving the tongues 418, 419 and the tongue on the bottom wall 406, respectively. It will be appreciated that a caulk, sealant or the like can be employed between the tongues and the grooves of the respective sections to form a compartment, in which the aerobic treatment chamber and clarifying chambers are formed.

As can be seen, the embodiment of FIGS. 19 and 20 has a minimum of structural sections; i.e., two, which when connected as shown in FIG. 20 form a single compartment. All embodiment similar to FIGS. 19 and 20 might be necessary when the system 400 is made of concrete and is of relatively large capacity, in which event handling and transporting the single structure would be difficult or impossible.

Figure 21:
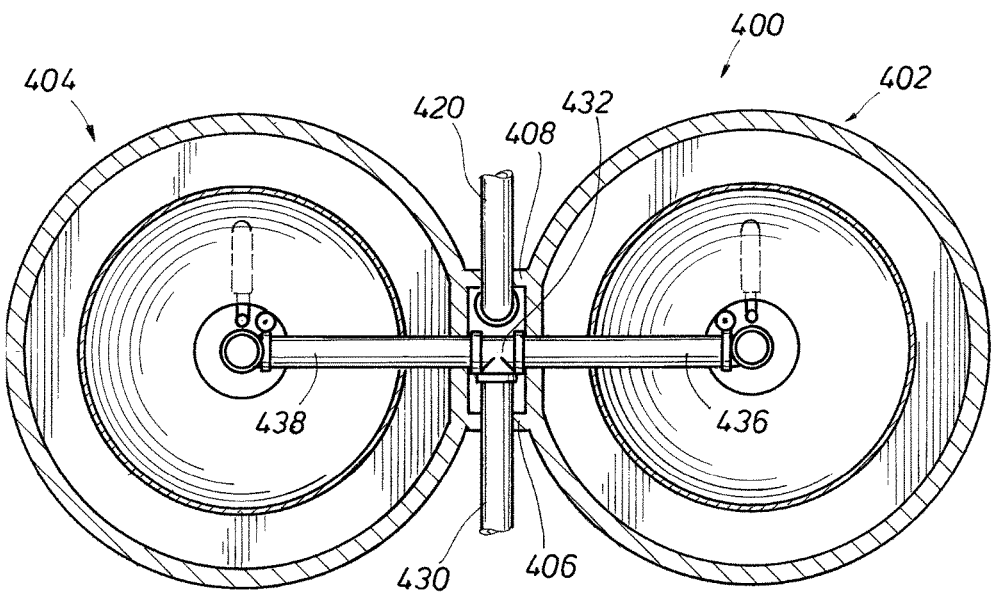
FIG. 21 is a top plan view of another embodiment of the AC system of the present invention.
Figure 22:
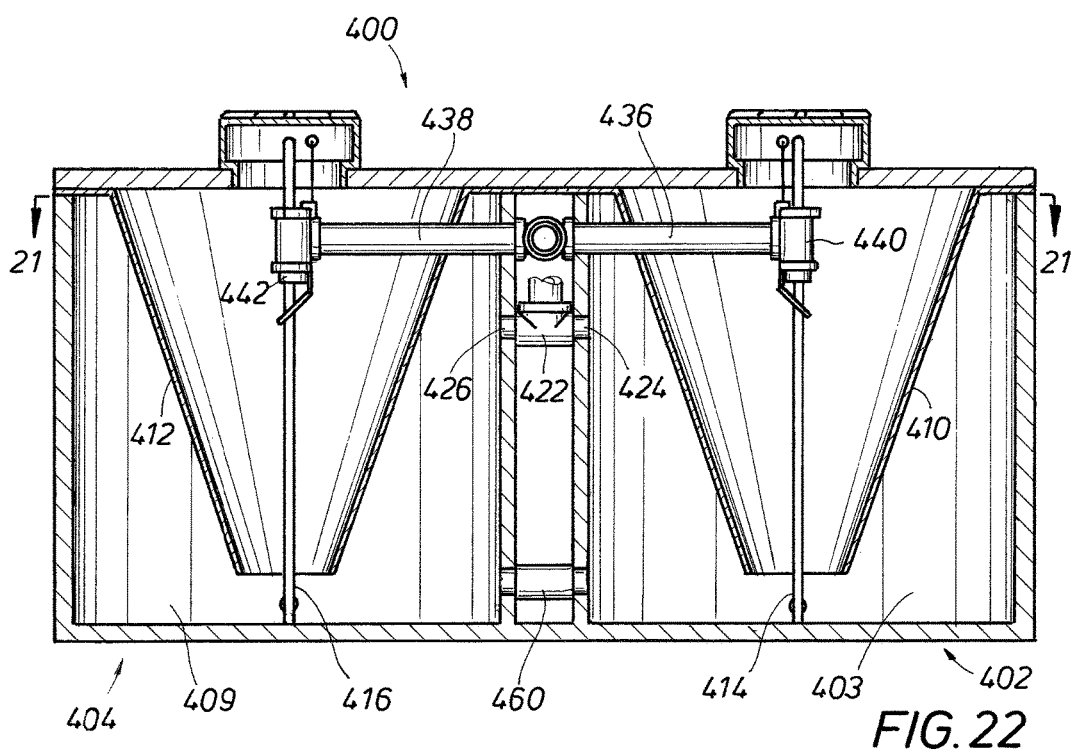
FIG. 22 is an elevational view, partly in section, of the embodiment of the present invention shown in FIG. 21.

Referring now to FIGS. 21 and 22, there is shown another embodiment of the present invention employing a preferred plumbing arrangement. The embodiment of the AC system of the present invention shown in FIGS. 21 and 22 is very similar to that shown in FIGS. 3-7, but with a slightly different plumbing arrangement. The structure of the AC system 400 shown in FIGS. 21 and 22, insofar as forming compartments for the various chambers, is substantially identical to that shown in FIGS. 3-7. Thus, AC system 400 has a first generally cylindrical structural portion 402 forming a first compartment and a second, structural portion 404 forming a second compartment. Structural sections 402 and 404 are connected together by gussets 406 and 408 to essentially form a rigid or monolithic structure in that the two structural portions 402 and 404 are bonded together and form a one-piece unit.

Disposed in structural section 402 is an inverted frustoconical partition 410, in the manner described above with respect to the embodiment shown in FIGS. 3-7 forms a clarifying chamber within the partition, the volume surrounding the partition forming an aerobic treatment chamber. In like manner, a partition 412 received in the compartment formed by structural section 404 has disposed therein a partition 412 forming an aerobic treatment chamber and a clarifying chamber. Aerators 414 and 416 extend into the aeration chambers 402 and 409 in structural sections 402 and 404, respectively.

There is a single inlet 420, which is connected to a T-422, which in turn is connected to conduits 424 and 426 which feed wastewater to be treated into chambers 403 and 409, respectively. There is also a single outlet 430, which is connected to a T-432, which in turn is connected to branch conduits 436 and 438, which in turn communicate with outlets 440 and 442, respectively. The AC system shown in FIGS. 21 and 22 is much more compact and has minimal plumbing protrusions, thereby making it easier to handle and transport without breakage.

As can also be seen from FIG. 22, there is a conduit 460 that extends through the walls of portions 402 and 404 providing open communication between the compartments formed therein. The conduit 460 ensures that there will always be equal volume in the compartments formed by structural sections 402 and 404. This is desirable and perhaps even necessary in the event one of the compartments would somehow empty or have a marked decrease in volume of water relative to the other compartment and, when the AC system 400 is made of fiberglass or similar material, might allow one end to float causing damage to the plumbing and rendering the unit inoperable. In essence, conduit 450 is an equalizer conduit.

Referring now to FIGS. 23 and 24, we are shown another embodiment of the AC system of the present invention. The AC system in FIG. 23, shown generally as 500, is a variation of the embodiments shown in FIGS. 1, 2, 19, and 20. Like the system shown in FIGS. 19 and 20, embodiment 500 comprises two structures, an upper section 502 and a lower section 504. Basically system 500 is identical to that shown in FIGS. 1, 2, 19, and 20 with the exception that there is, as noted, an upper structure portion 502 and a lower structure 504. Upper structure portion 502 has a peripheral groove in the downwardly facing walls framing structure 502 as well as downwardly facing grooves 506 and 508 in partitions 510 and 512, respectively. Lower structural section 504 has a peripherally extending tongue 514 formed in the upwardly facing surfaces of the walls forming structural section 504 and tongues 516 and 518 in partition sections 510A and 512A, respectively. Thus can be seen in FIG. 24, when upper structural section 502 is placed on lower structural section 504 such that the various tongues engage the registering grooves, the two sections can be formed into a single compartment defining two clarifying chambers and one aerobic treatment chamber.

It will be understood that all of the embodiments shown can include other equipment, some conventional and some non-conventional, typically used in aerobic wastewater treatment systems, such as level indicators, air compressors, pumps, controllers, etc.

It should be noted from the above, that the goals of the present invention can be accomplished in several ways. For example, there can be a single aerobic chamber having an inlet or multiple aerobic chambers having a common inlet but with a flow diverter to ensure that substantially equal flow of wastewater is introduced into each aerobic chamber. Additionally, as can be seen from the above description and accompanying drawings, the one-piece units of the present invention can be formed in numerous ways; e.g., casting, molding, or otherwise forming a monolithic structure, rigidly affixing multiple structures together using mechanical connections or, in the case where the structures are fiberglass or similar construction, effectively forming those two separate components into a monolithic structure by means of gussets, or the like which are adhesively fixed to the multiple components to form a monolithic structure in the sense that it can only be separated by cutting of the gusset or other bonding system but can be installed in a ground excavation as a one-piece unit.

The terms "monolithic" or "monolithically" as used herein are not intended to be limited to a structure cast as a single, one-piece, integral structure or fabricated as one single structure. Rather, the terms are used to include a single structure forming one or more compartments, multiple structures forming multiple compartments which are monolithically formed but which can be joined together. For example, with respect to the embodiment shown in FIGS. 1 and 2, while the housing 12 would generally be monolithically formed as a single piece. It will be recognized that the partitions 26 and 28 would be formed as separate pieces and affixed to the housing 12, to arrive at the structure shown in FIGS. 1 and 2.

The word "compartment" as used herein, means a volume or space defined by a bottom wall and a peripheral wall or walls. A compartment, in accordance with the present invention, provides a space or volume defined by a peripheral wall or walls and a bottom wall in which one or more chambers of the type under consideration can be formed.

As will be apparent from the description above and the drawings, the chambers which are formed according to the present invention can be formed by a structure which can be monolithic as for example, the embodiment of FIGS. 1 and 2 but which, particularly in the case of the other embodiments, is formed by partitions which are disposed in the compartments; e.g., the frusto-conical partitions seen, for example, in the embodiments of FIGS. 3-15.

In addition to the other advantages noted above regarding installation, a distinct advantage of the present invention is that the AC system can be tested as a one-piece, single unit by regulatory agencies for certification purposes. The advantages of this are great. By way of example, if an engineer specifies a 1000 gallon AWTS system for a given site installation, this would mandate that a certified, 1000 gallon AC tank system is to be installed. The engineer's requirements could typically not be met by installing two certified 500-gallon tanks, since two certified 500-gallon tanks are not a certified 1000-gallon tank. Accordingly, to meet the engineer's requirements, a large tank posing all the installation problems discussed above must be installed. In contrast, using the system of the present invention, an AC system can be certified as a 1000-gallon AC system even though it comprises, for example, two structures each of 500-gallon capacity because as listed/certified, it is a one-piece unit with a single inlet and a single outlet. As noted above, it is well understood by those in the art, and by way of example only, a certified, 1000-gallon AC system comprised of two structures, each of 500 gallon capacity, will have a smaller vertical height than a certified 1000-gallon system comprised of a single structure, and therefore much easier to install, since the depth of the excavation is shallower.

In the discussion above, reference is made to flow splitters or flow diverters. A flow splitter or diverter in the context of the present invention can include alternatives such as the use of multiple pumps to the multiple aerobic chambers, a single pump which alternatively pumps into one aerobic chamber and then the other aerobic chamber, all with the goal of maintaining approximately the same level of liquid in each chamber. Additionally, other types of flow splitters or diverters which can be used include distribution boxes such as those sold under the name ROTO-FLOW, diverter gates, so-called indexing valves, etc. Preferably, when the flow splitter or diverter is a distribution box or the like, the inlets to the aerobic chambers are generally below the equilibrium level of liquid into the two chambers, such that the static head will determine in which direction flow goes so as to generally maintain approximately the same level of liquid in each chamber.

The terms "single inlet" and "single outlet" refer to a single conduit into which wastewater to be treated flows into the aerobic chamber and a single conduit from which clarified, treated wastewater flows from the clarifier chamber, respectively, for disposal. As will be apparent from the description above and the drawings, there can be a single inlet which is plumbed to provide wastewater to be treated to two or more aerobic treatment chambers. Likewise, there can be a single outlet which is plumbed to receive clarified water from two or more clarifying chambers, but which results in a net single outflow for disposal.

It will be appreciated that for proper operation, the actual opening of the inlet directly into the aerobic chamber, without regard to any plumbing will be below that of the outlets from which water flows from the clarifying chambers to the single outlet. In other words, the geometry of the system is such that the water level in the aerobic chamber(s) will always be higher than the water level of the clarifying chambers to ensure proper flow of clarified water from the clarifying chambers.

Although reference is also made to pre-treatment tanks in describing some of the embodiments above, generally speaking, a pre-treatment tank is needed only when gravity flow comprises the feed to the aerobic chambers. For example, if the flow is pumped to the aerobic chambers, the source will generally be one which is substantially free from large solids which require a pre-treatment tank for settling. It is also to be understood that the clarifying chambers need not necessarily be of equal volume. For example, it could be an AC system of 500-gallon capacity and an AC system of 750-gallon capacity provided that the combined AC systems can be certified as a one piece unit of 1250 gallon capacity, and of course, also provided that the geometry; e.g., the sloped angles of the sloped walls is appropriate to minimize the deposit of solids on the sloped walls and provision is made to ensure approximate proportionate flow into the chambers.

In respect of ensuring that proportionate flow occurs out of each clarifying chamber, one way of accomplishing such would be to incorporate a surge control weir or other types of restrictions, as disclosed, for example, in U.S. Pat. No. 5,770,081, the disclosure of which is incorporated herein by reference for all purposes. With respect to the term "proportionate flow," it is intended to mean that when there are multiple chambers, the system is configured; e.g., by plumbing, flow diverters, surge control weirs, etc., such that each chamber contains an amount of liquid that is roughly proportional to the stated capacity of the system. For example, if the system is comprised of a single aerobic chamber and two clarifying chambers and has a 1000 gallon capacity, and one of the clarifying chambers has a 600 gallon capacity and the other clarifying chamber a 400 gallon capacity, then each chamber would handle a proportional amount of the total capacity.

As noted above, a distinct advantage of the one-piece unit of the present invention is that, generally speaking the size; e.g., depth, width, etc., of a ground excavation for placement of the unit can be minimized. In this regard, a one-piece unit can simply be placed in the ground excavation at proper grade without the necessity of having to plumb multiple tanks together once the individual tanks are in position in the ground excavation. While even with a one-piece unit, some plumbing is necessary, it will be appreciated that in most one-piece units, most of the plumbing can be incorporated into the one-piece unit before it is placed in the ground excavation, meaning that only plumbing connecting the primary waste water source and plumbing to connect to a drainage field, sprinkler system, etc. are necessary. Again, and in respect of requiring certification in many instances, the one piece unit of the present invention will have a single inlet and a single outlet, in the sense that if there are multiple clarifying chambers, they will all be connected together by suitable plumbing so that a single outflow occurs from the multiple chambers.

Another advantage of the present invention is the fact that the one-piece units can for the most part, be shipped or transported in that configuration. This is a marked improvement in efficiency over having to ship individual tanks to the installation site. It should be borne in mind that AWTS are frequently used in rather remote areas that are sometimes not readily accessible by roads. Accordingly, the ability to transport a one-piece unit to the installation site reduces installation time.

The foregoing description and examples illustrate selected embodiments of the present invention. In light thereof, variations and modifications will be suggested to one skilled in the art, all of which are in the spirit and purview of this invention.

The invention claimed is:

1. An aerobic treatment/clarifier system for use in an aerobic wastewater treatment system comprising a rectangular monolithic structure forming at least one compartment for at least one aerobic treatment chamber and first and second clarifier chambers, said aerobic treatment chamber and said clarifier chambers being generally horizontally displaced from one another, said aerobic treatment chamber being positioned between said first and second clarifier chambers, said compartment comprising a substantially flat bottom wall, first and second side walls, and front and back walls, said substantially flat bottom wall being under the majority of the aerobic treatment chamber, each of said first and second side walls defining at least portions of the interiors of said first and second clarifier chambers and having a substantially vertical portion with a lower end and a sloped portion, said sloped portion extending from said bottom wall to said lower end of said vertical portion, a first substantially vertically extending wing wall positioned between and connected to said front and back walls, said first wing wall having a lower edge spaced from said bottom wall and forming a first horizontal flow path between said first clarifier chamber and said aerobic treatment chamber, a second substantially vertically extending wing wall positioned between and connected to said front and back walls, said second wing wall having a lower edge spaced from said bottom wall and forming a second horizontal flow path between said second clarifier chamber and said aerobic treatment chamber, and at least one aerator for introducing an oxygen-containing gas into said aerobic chamber, said aerator being horizontally spaced from said clarifier chambers and positioned proximate said bottom wall, wherein there is a single inlet into said aerobic treatment chamber and a single, common outlet in open communication with said first and second clarifier chambers.

2. An aerobic treatment/clarifier system for use in aerobic wastewater treatment systems comprising a structure having first and second connected sections, said sections when connected providing a single compartment for at least one aerobic treatment chamber and first and second clarifier chambers, said aerobic treatment chamber and said clarifier chambers being generally horizontally displaced from one another, said aerobic treatment chamber being positioned between said first and second clarifier chamber, said single compartment comprising a substantially flat bottom wall, first and second side walls, and front and back walls, said substantially flat bottom wall being under the majority of said at least one aerobic treatment chamber, each of said first and second side walls defining at least portions of the interiors of said first and second clarifier chambers, and having a substantially vertical portion with a lower end and a sloped portion, said sloped portion extending from said bottom wall to said lower end of said vertical portion, a first substantially vertically extending wing wall positioned between and connected to said front and back walls, said first wing wall having a lower edge spaced from said bottom wall and forming a first horizontal flow path between said first clarifier chamber and said aerobic treatment chamber, a second substantially vertically extending wing wall positioned between and connected to said front and back walls, said second wing wall having a lower edge spaced from said bottom wall and forming a second horizontal flow path between said second clarifier chamber and said aerobic treatment chamber, and at least one aerator for introducing an oxygen-containing gas into said aerobic chamber, said aerator being positioned proximate said bottom wall, wherein there is a single inlet into said aerobic treatment chamber and a single, common outlet in open communication with said first and second clarifier chambers, wherein said first and second sections are substantially rectangular, each of said sections having connectable faces comprising formations projecting as to one and receiving as to the other and wherein said formations are engaged when said first and second sections are connected.

3. An aerobic treatment/clarifier system for use in an aerobic wastewater treatment system comprising:
  a monolithic structure having a bottom wall and a peripheral wall, said bottom wall and said peripheral wall defining a compartment, said peripheral wall having a racetrack shape when viewed in top plan view;
  said peripheral wall and said bottom wall forming a single aeration chamber, the bottom wall under the majority of the aerobic chamber being substantially flat there being at least one aerator for introducing an oxygen-containing gas into said aerobic chamber, said aerator being positioned proximate said bottom wall;
  an inlet for introducing wastewater into said aeration chamber;
  first and second inverted frusto-conical partitions disposed in said compartment forming first and second clarifying chambers, said aeration chamber and said clarifying chambers being generally horizontally displaced from one another, said aeration chamber being in surrounding relationship to said clarifying chamber; and
  a plumbing system comprising a first outlet for clarified water from said first clarifier and a second outlet for clarified water from said second clarifier, said plumbing system including a conduit extending through said peripheral wall and being in open communication with said first and second outlets.

4. An aerobic treatment/clarifier system for use in an aerobic wastewater treatment system comprising a structure providing at least two compartments each compartment providing an aerobic treatment chamber and a clarifier chamber said clarifier chamber being formed by an inverted frustoconical partition disposed in said compartment, said aerobic treatment chambers and said clarifier chambers being generally horizontally displaced from one another, said aerobic treatment chamber being in surrounding relationship to said clarifier chamber, wherein there is a single inlet, in open communication with each of said aerobic chambers, and a single, common outlet in open communication with said two clarifier chambers, there being a substantially flat bottom wall under the majority of each of said aerobic chambers there being at least one aerator for introducing an oxygen-containing gas into each of said aerobic chambers, said aerators being positioned proximate said bottom wall.

5. The system of claim 4, wherein said structure comprises at least two housings, each of said housings defining a respective one of said compartments, said housings being connected together to form a rigid, one-piece unit.

6. An aerobic treatment/clarifier system for use in aerobic wastewater treatment systems comprising a structure, said structure having first and second sections, at least one connector for connecting said first and second sections together, said sections when connected providing two compartments, each compartment having an aerobic treatment chamber and a clarifier chamber, said clarifier chamber being formed by an inverted frustoconical partition disposed in said compartment, said aerobic treatment chambers and said clarifier chambers being generally horizontally displaced from one another, said aerobic treatment chambers being in surrounding relationship to said clarifier chambers, wherein there is a single inlet in open communication with each of said aerobic chambers, and a single, common outlet in open communication with said two clarifier chambers, there being a substantially flat bottom wall under the majority of each of said aerobic chambers and first and second aerators for introducing an oxygen-containing gas into each of said aerobic chambers, said aerators being positioned proximate said bottom wall.

7. The system of claim 6, wherein said first and second sections are substantially rectangular.

8. An aerobic treatment/clarifier system for use in an aerobic wastewater treatment system comprising a structure comprising at least two compartments, each of said compartments providing an aerobic chamber and a clarifier chamber said clarifier chamber being formed by an inverted frustoconical partition disposed in said compartment, said aerobic chambers and said clarifier chambers being generally horizontally displaced from one another, each of said aerobic chambers being in surrounding relationship to respective ones of said clarifier chambers, said structure including a single inlet for wastewater in open communication with each of said aerobic chambers, there being a substantially flat bottom wall under the majority of each of said aerobic chambers, there being an aerator for introducing an oxygen-containing gas into each of said aerobic chambers, said aerators being positioned proximate said bottom wall, and wherein said structure comprises at least two housings, each of said housings comprising a respective one of said compartments for said aerobic treatment chamber and said clarifier chamber, said housing being connected together to form a rigid, one-piece unit.

9. The system of claim 8, comprising a single common inlet into said aerobic treatment chambers and a single, common outlet in open communication with said clarifier chambers.

10. The system of claim 8, wherein there is a conduit in open communication with said two compartments to maintain equal volumes of liquid in said two compartments.

11. An aerobic treatment/clarifier system for use in an aerobic wastewater treatment plant comprising a structure, said structure comprising first and second housings, said first and second housings being connected together to form a rigid, one-piece unit, each of said first and second housings forming first and second compartments, each of said compartments housing an aerobic treatment chamber and a clarifier chamber, said clarifier chamber being formed by an inverted frustoconical partition disposed in said compartment, all of said aerobic treatment chambers and said clarifier chambers being generally horizontally displaced from one another.

12. The system of claim 3 wherein said plumbing system comprises a first piping connected to a first overflow and second piping connected to a second overflow, said first and second piping being connected to a first end of said conduit internally of said structure, a second end of said conduit forming a single outlet for treated wastewater from said structure.

* * * * *